(12) United States Patent
Drost-Hansen et al.

(10) Patent No.: US 10,389,718 B2
(45) Date of Patent: *Aug. 20, 2019

(54) CONTROLLING DATA USAGE USING STRUCTURED DATA GOVERNANCE METADATA

(71) Applicant: ADOBE INC., San Jose, CA (US)

(72) Inventors: Christine Elaine Drost-Hansen, Half Moon Bay, CA (US); Christopher Reid Error, Alpine, UT (US); Philip John Grieshaber, Plainview, NY (US)

(73) Assignee: Adobe Inc., San Jose, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 15/139,059

(22) Filed: Apr. 26, 2016

(65) Prior Publication Data
US 2017/0308715 A1 Oct. 26, 2017

(51) Int. Cl.
*G06F 21/62* (2013.01)
*H04L 29/06* (2006.01)

(52) U.S. Cl.
CPC .......... *H04L 63/10* (2013.01); *G06F 21/6245* (2013.01); *G06F 21/6209* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 7,243,097 B1 | 7/2007 | Agrawal et al. | |
| 8,024,651 B1 | 9/2011 | Error | |
| 8,843,997 B1 | 9/2014 | Hare | |
| 9,324,082 B2 | 4/2016 | Johnson et al. | |
| 9,542,489 B2 | 1/2017 | Fleischman et al. | |
| 9,576,147 B1* | 2/2017 | McClintock | G06F 21/6218 |
| 9,621,528 B2 | 4/2017 | Rajshekar et al. | |
| 9,721,086 B2 | 8/2017 | Shear et al. | |
| 9,760,831 B2 | 9/2017 | Tavakkol et al. | |
| 2002/0065857 A1 | 5/2002 | Michalewicz et al. | |

(Continued)

OTHER PUBLICATIONS

First Action Interview Pre-Interview Communication dated Sep. 14, 2017 in U.S. Appl. No. 15/139,049, 4 pages.

(Continued)

*Primary Examiner* — Kambiz Zand
*Assistant Examiner* — Arezoo Sherkat
(74) *Attorney, Agent, or Firm* — Shook, Hardy & Bacon LLP

(57) ABSTRACT

Systems and methods provide for data management and governance to enforce proper usage of data. Data is tagged with data governance metadata dictating usage of the data. Standard types of data governance metadata are set forth with each type having predefined options such that applications can share data and understand the associated data governance metadata. When data is to be used by an application, an available action is identified, and a set of data governance rules for that action is accessed. The data governance rules set forth an impact of each type of data governance metadata on the ability to perform that action. As such, the action is allowed or disallowed for the data based on the data governance metadata for the data and on the data governance rules for the action.

20 Claims, 11 Drawing Sheets

(56) References Cited

U.S. PATENT DOCUMENTS

| | | |
|---|---|---|
| 2004/0249768 A1 | 12/2004 | Kontio et al. |
| 2006/0265689 A1* | 11/2006 | Kuznetsov .............. G06F 9/546 717/117 |
| 2007/0156770 A1 | 7/2007 | Espelien |
| 2008/0027895 A1 | 1/2008 | Combaz |
| 2008/0091682 A1* | 4/2008 | Lim .................... G06F 17/3089 |
| 2008/0313207 A1 | 12/2008 | Modad et al. |
| 2009/0012991 A1 | 1/2009 | Johnson et al. |
| 2009/0119576 A1 | 5/2009 | Pepper et al. |
| 2011/0145327 A1 | 6/2011 | Stewart |
| 2013/0073389 A1 | 3/2013 | Heath |
| 2013/0073400 A1 | 3/2013 | Heath |
| 2013/0073473 A1 | 3/2013 | Heath |
| 2013/0111220 A1 | 5/2013 | Friedlander et al. |
| 2014/0019846 A1 | 1/2014 | Gilead et al. |
| 2014/0085485 A1 | 3/2014 | Gavita |
| 2014/0324808 A1 | 10/2014 | Sandhu et al. |
| 2014/0379673 A1* | 12/2014 | Lim .................... G06F 17/3089 707/694 |
| 2015/0078247 A1* | 3/2015 | Maharajh .......... G06F 17/30035 370/312 |
| 2015/0193809 A1 | 7/2015 | Bugenhagen |
| 2015/0302448 A1 | 10/2015 | Oh et al. |
| 2016/0085978 A1* | 3/2016 | Meyer .................... G06F 21/62 726/28 |
| 2016/0127548 A1 | 5/2016 | Sharma |

OTHER PUBLICATIONS

Notice of Allowance dated Dec. 18, 2017 in U.S. Appl. No. 15/139,049, 20 pages.
First Action Interview Pre-Interview Communication dated Dec. 21, 2017 in U.S. Appl. No. 15/139,040, 4 pages.
Notice of Allowance dated Apr. 27, 2018 in U.S. Appl. No. 15/139,040, 23 pages.
First Action Interview Pre-Interview Communication dated Sep. 20, 2018 in U.S. Appl. No. 16/037,651, 5 pages.
First Action Interview Office Action dated Jan. 25, 2019 in U.S. Appl. No. 16/037,651, 5 pages.

* cited by examiner

| TYPE OF DATA GOVERANCE MEDATA | AVAILABLE OPTIONS | DEFAULT |
|---|---|---|
| 1. INFORMATION ABOUT A PERSON | YES<br>NO | YES |
| 2. INFORMATION THAT CAN BE USED TO IDENTIFY AND/CONTACT A PERSON | L1 – ANONYMOUS/UNRESTRICTED<br>L2 – INDIRECTLY IDENTIFIABLE DATA<br>L3 – PERSONALLY IDENTIFIABLE INFORMATION (DIRECTLY IDENTIFIABLE DATA)<br>L4 – SENSITIVE PERSONAL DATA | L3 |
| 3. AUTHENTICATION STATE AT TIME OF DATA COLLECTION | IDENTIFIED (EXPLICITLY LOGGED IN/AUTHENTICATED)<br>INCOGNITO (EXPLICITLY LOGGED OUT)<br>AMBIGUOUS<br>NOT PROVIDED | NOT PROVIDED |
| 4. STANDARD CONTRACTUAL CONSIDERATIONS | C1: DATA CANNOT BE USED TO BUILD PROFILES FOR CROSS-SITE TARGETING<br>C2: DATA CANNOT BE USED FOR ANY TARGETING, BUT CAN BE USED FOR ANALYTICS/ATTRIBUTION<br>C3: DATA CANNOT BE USED TO BUILD PROFILES FOR SAME-SITE TARGETING<br>C4: DATA CANNOT BE USED TO BUILD PROFILES FOR ANALYTICS<br>C5: DATA CANNOT BE USED TO BUILD ANY PROFILES FOR ANY TARGETING<br>C6: DATA CANNOT BE SENT TO ADVERTISING PLATFORMS<br>C7: DATA CANNOT BE USED WITH PERSONALLY IDENTIFIABLE INFORMATION<br>C8: DATA CANNOT BE DISCLOSED TO A THIRD PARTY | NONE |
| 5. OTHER INFORMATION | FREE FORM TEXT | BLANK |

*FIG. 2.*

| # | CONSIDERATION | FURTHER CLARIFICATION |
|---|---|---|
| C1 | DATA CANNOT BE USED TO BUILD PROFILES FOR CROSS-SITE TARGETING | CROSS SITE REFERS TO SITES NOT DIRECTLY OWNED OR AFFILIATED WITH CUSTOMER |
| C2 | DATA CANNOT BE USED FOR ANY TARGETING, BUT CAN BE USED FOR ANALYTICS / ATTRIBUTION | ANALYTICS MEANS ANALYSIS DONE ON FIRST PARTY WEB-SITES |
| C3 | DATA CANNOT BE USED TO BUILD PROFILES FOR SAME-SITE TARGETING | SAME-SITE MEANS CUSTOMER- OWNED FIRST PARTY SITE |
| C4 | DATA CANNOT BE USED TO BUILD PROFILES FOR ANALYTICS | ANALYTICS MEANS ANALYSIS DONE ON FIRST PARTY WEB-SITES |
| C5 | DATA CANNOT BE USED TO BUILD ANY PROFILES OR FOR ANY TARGETING | |
| C6 | DATA CANNOT BE SENT TO ADVERTISING PLATFORMS | |
| C7 | DATA CANNOT BE USED WITH DIRECTLY IDENTIFIABLE INFORMATION (PII) | |
| C8 | DATA CANNOT BE DISCLOSED TO A THIRD PARTY | THIRD PARTY INCLUDES ANY COMPANY NOT DIRECTLY OWNED BY THE CUSTOMER |

*FIG. 5.*

| LIST OF ACTIONS USING APPLICATION (704) | IMPACT OF DGM FOR IDENTIFYING/CONTACTING PERSON (706) | IMPACT OF DGM FOR AUTHENTICATION STATE (708) | IMPACT OF DGM FOR STANDARD CONTRACTUAL CONSIDERATIONS (710) |
|---|---|---|---|
| 1. DEVICE LEVEL ANALYTICS (CLASSIC ANALYTICS) | CODEPENDENT ON WHETHER THERE IS RESTRICTION C7; OTHERWISE NO IMPACT | NO IMPACT | C4: CANNOT BE USED TO BUILD PROFILES FOR ANALYTICS<br>C7: CANNOT BE USED WITH PII |
| 2. STITCHED ANALYTICS (CROSS DEVICE | PROHIBITED IF "TREAT AS PII" | IDENTIFIED ONLY | C3: CANNOT BE USED IN PROFILES FOR SAME SITE TARGETING<br>C4: DATA CANNOT BE USED TO BUILD PROFILES FOR ANALYTICS<br>C8: DATA CANNOT BE DISCLOSED TO A 3RD PARTY |
| 3. ON-SITE TARGETING/CUSTOMIZATION (CONTENT, OFFERS ON A WEBSITE AIMED AT A SPECIFIC PERSON OR SEGMENT) | CODEPENDENT ON WHETHER THERE IS RESTRICTION C7; OTHERWISE NO IMPACT | DEPENDS ON CUSTOMER'S PRIVACY POLICY | C2: DATA CANNOT BE USED FOR ANY TARGETING, BUT CAN BE USED FOR ANALYTIC / ATTRIBUTION,<br>C3:DATA CANNOT BE USED TO BUILD PROFILES FOR SAME-SITE TARGETING<br>C5: DATA CANNOT BE USED TO BUILD ANY PROFILES OR FOR ANY TARGETING<br>C7: DATA CANNOT BE COMBINED OR USED WITH PII |
| 4. OFF-SITE TARGETING-INVOLVES EXPORTING DATA. USER LEVER-EG SENDING COOKIE IDS TO AD NETWORK, AD RE-TARGETER | PROHIBITED IF "TREAT AS PII" | NO IMPACT; UP TO CUSTOMER | C1: DATA CANNOT BE USED TO BUILD PROFILES FOR CROSS-SITE TARGETING<br>C2: DATA CANNOT BE USED FOR ANY TARGETING, BUT CAN BE USED FOR ANALYTICS / ATTRIBUTION<br>C5: DATA CANNOT BE USED TO BUILD ANY PROFILES OR FOR ANY TARGETING<br>C6: DATA CANNOT BE SENT TO ADVERTISING PLATFORMS<br>C7: DATA CANNOT BE COMBINED OR USED WITH PII (DEPENDENT ON PII FLAG) |
| 5. MULTI-CHANNEL MARKETING (CONTACT VIA EMAIL, SMS, DIRECT MAIL) | CODEPENDENT ON WHETHER THERE IS A RESTRICTION C7; OTHERWISE NO IMPACT | DEPENDS ON CUSTOMER'S PRIVACY POLICY | C2: DATA CANNOT BE USED FOR ANY TARGETING, BUT CAN BE USED FOR ANALYTIC / ATTRIBUTION,<br>C5: DATA CANNOT BE USED TO BUILD ANY PROFILES OR FOR ANY TARGETING<br>C7: DATA CANNOT BE COMBINED OR USED WITH PII (DEPENDENT ON PII FLAG) |

*FIG. 7.*

| 6. INTERNAL EXPERIENCE MANAGEMENT (CUSTOMER CARE, INSIDE SALES) | CODEPENDENT ON WHETHER THERE IS A RESTRICTION C7; OTHERWISE NO IMPACT | DEPENDS ON CUSTOMER'S PRIVACY POLICY | C2: DATA CANNOT BE USED FOR ANY TARGETING, BUT CAN BE USED FOR ANALYTIC / ATTRIBUTION, C3: DATA CANNOT BE USED TO BUILD PROFILES FOR SAME-SITE TARGETING C5: DATA CANNOT BE USED TO BUILD ANY PROFILES OR FOR ANY TARGETING C7: DATA CANNOT BE COMBINED OR USED WITH PII (DEPENDENT ON PII FLAG) |
|---|---|---|---|
| 7. EXPORT OF CUSTOMER'S OWN DATA TO OTHER (TO CUSTOMER'S ON-PREM SYSTEM) | NO IMPACT | NO IMPACT | NONE |
| 8. EXPORT TO OTHER, NON-CUSTOMER-OWNED SYSTEM, ANY OTHER PLATFORMS, ETC. | MAY DEPEND ON RESTRICTIONS | NO IMPACT | C8: DATA CANNOT BE DISCLOSED TO A 3RD PARTY |

CONTROLLING DATA USAGE USING STRUCTURED DATA GOVERNANCE METADATA

BACKGROUND

The Internet has presented an ability to collect enormous amounts of detailed data about people that was previously unattainable from just offline sources. While data collected both online and offline provides rich information useful for analytics, marketing, advertising, and other purposes, the data collection and usage presents serious concerns related to the rights, obligations, and restrictions related to the data. For instance, a variety of legal and contractual restrictions may apply to data collection and usage. Legal restrictions are numerous and nuanced, varying widely by region, while contractual restrictions vary greatly among data sources, including different data collection and sharing contracts, privacy policies and settings, and consumer opt-outs.

Given the vast amount and variety of data collected both online and offline and the varying restrictions that apply, complying with such restrictions has proven to be a difficult task. Analytics applications and other types of digital marketing applications that collect data are typically responsible stewards of their own data since the applicable restrictions are generally well-known for a given set of use cases. However, the problem is exacerbated when data is combined or shared among applications, or in a centralized repository (e.g., a "cloud data platform"). In particular, it has become commonplace for applications that use data to obtain the data from various sources, such as third-party data providers, advertising ecosystem participants, offline customer relationship management (CRM) and point of sale (POS) systems. Each of these data sources may have different restrictions affecting usage of the data. An application receiving such data may not have a good understanding of these restrictions. As a result, this sharing and combination of data could result in improper, unexpected, or unauthorized use of data. Recognition of the major constraints involved in data usage is problematic, as is sharing those constraints with the broader digital marketing ecosystem.

SUMMARY

Embodiments of the present invention relate to, among other things, using a set of data governance rules to control usage of data based on structured data governance metadata tagged to the data. When data is to be used by an application, the data governance metadata tagged to the data is consulted to determine if the data can be used for a particular action. In particular, the data governance metadata is accessed. Additionally, an action is identified, and a set of data governance rules for that type of action is accessed. An impact of the data governance metadata on the ability to perform the action using the data is determined based on the set of data governance rules. If the impact indicates the action is not permissible using the data, the action is prevented from being performed using the data. Alternatively, if the impact indicates the action is permissible using the data, the action is allowed to be performed by the application using the data.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 2 is a table showing exemplary standard types of data governance metadata with available metadata options for each type;

FIG. 5 is a table illustrating options for data governance metadata specifying standard contractual considerations;

FIG. 7 is a table illustrating data governance rules for various types of actions based on different types of data governance metadata;

DETAILED DESCRIPTION

Figure 1A:
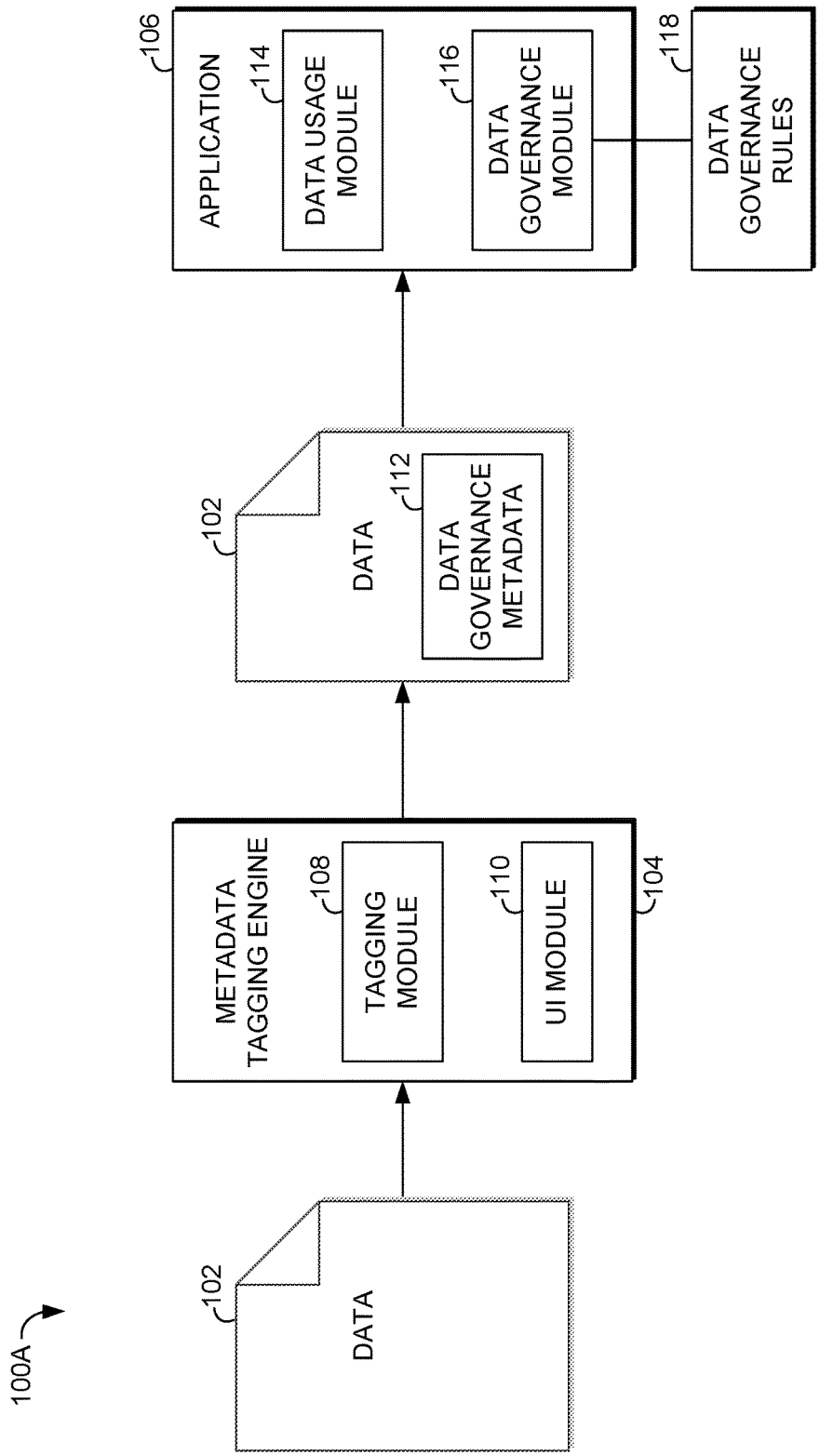
FIGS. 1A and 1B are block diagrams illustrating exemplary systems in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The term "data" is used broadly herein to include any type of information collected from online or offline activities. "Online" data includes any information collected via a device connected to a network (e.g., personal computer, mobile device, "Internet of Things" device, etc.). In some instances, data includes information about a person and/or a person's interaction (e.g., with a website, app, POS system, etc.); while in other instances, data may be generic and not related to a person (e.g., catalog data, weather data, etc.).

The term "data governance metadata" refers to information describing data that dictates how the data can be properly used. In accordance with the description herein, the data governance metadata may indicate: (1) whether the data is information about a person; (2) an extent to which the data can be used to identify and/or contact a person; (3) an authentication state at time of data collection; (4) any standard contractual considerations; and (5) other information relevant to usage of the data.

The term "authentication state" refers to an extent to which a person is authenticated when data is collected. For instance, an authentication state may indicate whether a person is logged in (authenticated), explicitly logged out, or neither.

The term "standard contractual consideration" refers to a constraint placed on data by way of contractual restriction. Contractual restrictions could involve, for instance: third party data providers, ad network providers, social data providers, customer contracts with application providers, privacy policy agreements with consumers, and consumer opt-out preferences. The standard contractual considerations are "standard" in the sense that a predefined set of options are available for selection to cover a number of typical contractual restrictions.

The term "data governance rules" refers to a set of rules that dictate whether data can be used to perform different activities based on associated data governance metadata. As described in further detail herein, a set of data governance rules is defined for each of a number of different types of actions that can be taken using data. For a given action, the set of data governance rules define an impact of each type of data governance metadata on the ability to perform the action. Each application that uses data can have its own set of data governance rules based on its own use cases and how the data governance metadata applies.

The term "user" refers to a person who employs an application to perform an action on data, including tagging data with data governance metadata or performing an activity with the data, such as analysis or marketing actions.

A possible approach to addressing the problem of data management is to tag data with metadata that can be inspected when determining how to properly use the data. However, for any piece of data, there could be hundreds of pieces of associated metadata. Storing all the possible metadata is infeasible as the storage requirements would be massive. As a result, most applications store minimal amounts of data usage restriction information, and must base system features on knowledge of their own individual contracts. This approach tends to be overly restrictive on what data can be shared, greatly limiting the usage of data. Additionally, the individual contract terms that limit data usage and define application-specific features are not recognized by other applications. For instance, one application may store certain metadata that helps to control usage of the data within that application, but when that data is passed to another application, the receiving application doesn't accept the metadata, which could lead to improper data usage.

Embodiments of the present invention address the technical challenge of controlling data usage by providing a data management and governance solution that determines whether data can be used to perform different types of actions based on data governance metadata tagged to the data and data governance rules associated with each type of action. Generally, there are numerous types of actions that can be performed using data, such as various analytics, data sharing, and marketing actions. A set of actions are defined, and a set of data governance rules are defined for each action that sets forth the impact of data governance metadata on usage of the data for that action. A set of data governance rules for a particular type of action may indicate, for instance: (1) the impact of data governance metadata regarding the extent to which the data includes information that can be used to identify and/or contact a user; (2) the impact of data governance metadata identifying an authentication state of the user at a time of data collection; and (3) the impact of data governance metadata identifying any standard contractual considerations that apply to the data.

When an application intends to use data for a particular action, data governance metadata tagged to the data is accessed. Additionally, a set of data governance rules for that type of action is accessed. The impact of the data governance metadata on the ability to perform the action is then determined based on the set of data governance rules. If it is determined the action is not permissible using the data, the action is prevented from being performed using the data. For instance, the action may be disabled in an application intending to use the data or the data may be filtered from a set of data being retrieved for the action. Alternatively, if it is determined the action is permissible using the data, the action is enabled within the application for the data.

With reference now to the drawings, FIG. 1A is a block diagram illustrating an exemplary system 100A for data management and governance to ensure proper usage of data in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100A is an example of a suitable architecture for implementing certain aspects of the present disclosure. Among other components not shown, the system 100A includes a metadata tagging engine 104 configured to tag data, such as the data 102, with data governance metadata. In the example shown in FIG. 1, the metadata tagging engine 104 has tagged the data 102 with the data governance metadata 112. The metadata tagging engine 104 may be provided, for instance, by an application that collects, transfers, receives, and/or performs actions using the data 102.

The metadata tagging engine 104 is configured to tag data with a standard set of data governance metadata. The metadata tagging engine 104 may tag data with data governance metadata using an approach such as the method 300 described below with reference to FIG. 3. By using a standard set of data governance metadata, data can be shared among applications, and each application can understand the data governance metadata associated with the shared data. FIG. 2 provides a table 202 showing exemplary standard types of data governance metadata 204 used in accordance with some aspects of the present disclosure. As shown in FIG. 2, the types of data governance metadata 204 include:

Data Governance Metadata 1: Metadata indicating whether the data includes information about a person, including activities of a person.

Data Governance Metadata 2: Metadata indicating an extent to which the data includes information that can be used to identify and/or contact a person.

Data Governance Metadata 3: Metadata identifying an authentication state at the time of data collection.

Data Governance Metadata 4: Metadata identifying standard contractual considerations (if any) that apply to the data.

Data Governance Metadata 5: Metadata identifying other information that impacts usage of the data.

Each type of data governance metadata 204 includes a number of predefined options 206 that can be provided to describe the data (with the exception of data governance metadata 5, which allows for free form text). Having predefined options for each type of data governance metadata provides a standard approach that further facilitates applications understanding data governance metadata associated with shared data. For a given piece of data, the options for a given type of data governance data may be mutually exclusive (e.g., only one option can be selected for data governance metadata 1) or any number of options may be selected (e.g., multiple options can be selected for data governance metadata 4).

In accordance with some embodiments, a default option 208 is defined for each type of data governance metadata. The default option 208 is selected and tagged to data in circumstances in which a specific option from the available options 206 has not been determined.

It should be understood that the types of data governance metadata 204, available options 206, and default option 208 in FIG. 2 are shown by way of example only. Additional/other types of data governance metadata, options, and default options may be employed in accordance with various implementations of the present disclosure.

Returning to FIG. 1, to facilitate tagging the data 102 with the data governance metadata 112, the metadata tagging engine 104 includes a tagging module 108 and user interface (UI) module 110. The tagging module 108 operates to automatically tag the data 102 with appropriate options for the various types of data governance metadata. The tagging module 108 may be configured to automatically tag the data 102 with data governance metadata 112 in a variety of different manners. In some configurations, the tagging module 108 is configured to automatically tag the data 102 with particular data governance metadata without any analysis of the data 102. This could include a preset determination based on knowledge of a data source. For example, in instances in which the tagging module 108 is provided by an application collecting data, the standard contractual considerations that apply to all data collected by the application may be known, and the tagging module 108 may apply the same standard contractual considerations data governance metadata to all collected data. As another example, when obtaining data from a third-party data source, the value for the authentication state may be automatically set to a not provided authentication state because the third-party data source doesn't track this type of metadata.

In some configurations, the tagging module 108 operates to automatically tag the data 102 with the data governance module via an API. For instance, if the data 102 is obtained from a data source (not shown), the API may request the data source to provide data governance metadata for the data 102. The tagging module 108 tags the data 102 with the data governance metadata obtained from the data source via the API.

In further configurations, the tagging module 108 operates to automatically analyze the data 102 and/or associated metadata to select appropriate data governance metadata options for the data 102. For instance, the tagging module 108 may maintain a dictionary that maps keywords and/or text patterns (e.g., presence of @ symbol) to available options for data governance metadata. Accordingly, the text of the data 102 or associated metadata (e.g., a data field for the data 102) can be analyzed to identify a keyword and/or text pattern from the dictionary that matches the text. The data governance metadata option(s) mapped to that keyword and/or text pattern is then selected by the tagging module 108 to tag the data 102. In some configurations, privacy settings and other associated contractual requirements could be automatically analyzed to select appropriate data governance metadata 112. In some instances, the tagging module 108 may not be able to automatically determine an appropriate option for each type of data governance metadata. In such instances, the tagging module 108 may be configured to select a default option.

The metadata tagging engine 104 also includes a UI module 110 that allows a user to manually select data governance metadata 112 for the data 102. In instances in which the tagging module 108 has automatically selected data governance metadata options for the data 102, the UI module 110 presents the selected options and allows the user to verify or change the assigned data governance metadata 112. In other instances, the data 102 has not been automatically tagged for at least one type of data governance metadata, and the UI module 110 presents a UI that indicates that data governance metadata needs to be assigned to the data 102. The UI indicates the available options for each type of data governance metadata that needs to be assigned to the data 102 and allows the user to select from the available options. The data 102 is thereby tagged with data governance metadata 112 based on the user selection(s).

After the data 102 has been tagged with data governance metadata 112, an application (e.g., the application 106) that intends to use the data 102 consults the data governance metadata 112 to determine proper usage of the data 102. As shown in FIG. 1A, the application 106 includes a data usage module 114 that provides various actions that can be performed by the application 106 using the data 102. The application 106 may reside on any type of device, such as a server device or a user device (e.g., personal computer, mobile device, "Internet of things" device, etc.). Among other things, the actions that can be taken by the application 106 include analytics activities, advertising activities, and marketing activities. For instance, the actions could include marketing activities for a user device, such as sending marketing messages to a user device based on the data 102.

The application 106 includes a data governance module 116 that controls whether certain actions can be performed using the data 102 based on the data governance metadata 112. The data governance module 116 may control usage of the data 102 by the data usage module 114 using an approach such as the method 600 described below with reference to FIG. 6. Generally, the data governance module 116 references the data governance metadata 112 and data governance rules 118 to determine proper usage of the data 102. There are numerous types of actions that can be performed by the data usage module 114 using the data 102, such as various analytics, data sharing, and marketing actions. The data governance rules 118 defines a set of data governance rules for each type of action that sets forth how the different types of data governance metadata impact usage of data for each action. Accordingly, when the data usage module 114 intends to use the data 102 to perform a particular action, the data governance metadata 112 tagged to the data 102 is accessed. Additionally, the set of data governance rules applicable to the action are accessed from the data governance rules 118. The impact of the data governance metadata 112 on the ability to perform the action is determined based on the set of data governance rules for that particular action. If it is determined that the impact indicates the action is not permissible using the data 102, the action is prevented from being performed using the data 102. Alternatively, if it is determined that the impact indicates the action is permissible using the data 102, the action is allowed to be performed by the application 106 using the data 102.

Figure 1B:
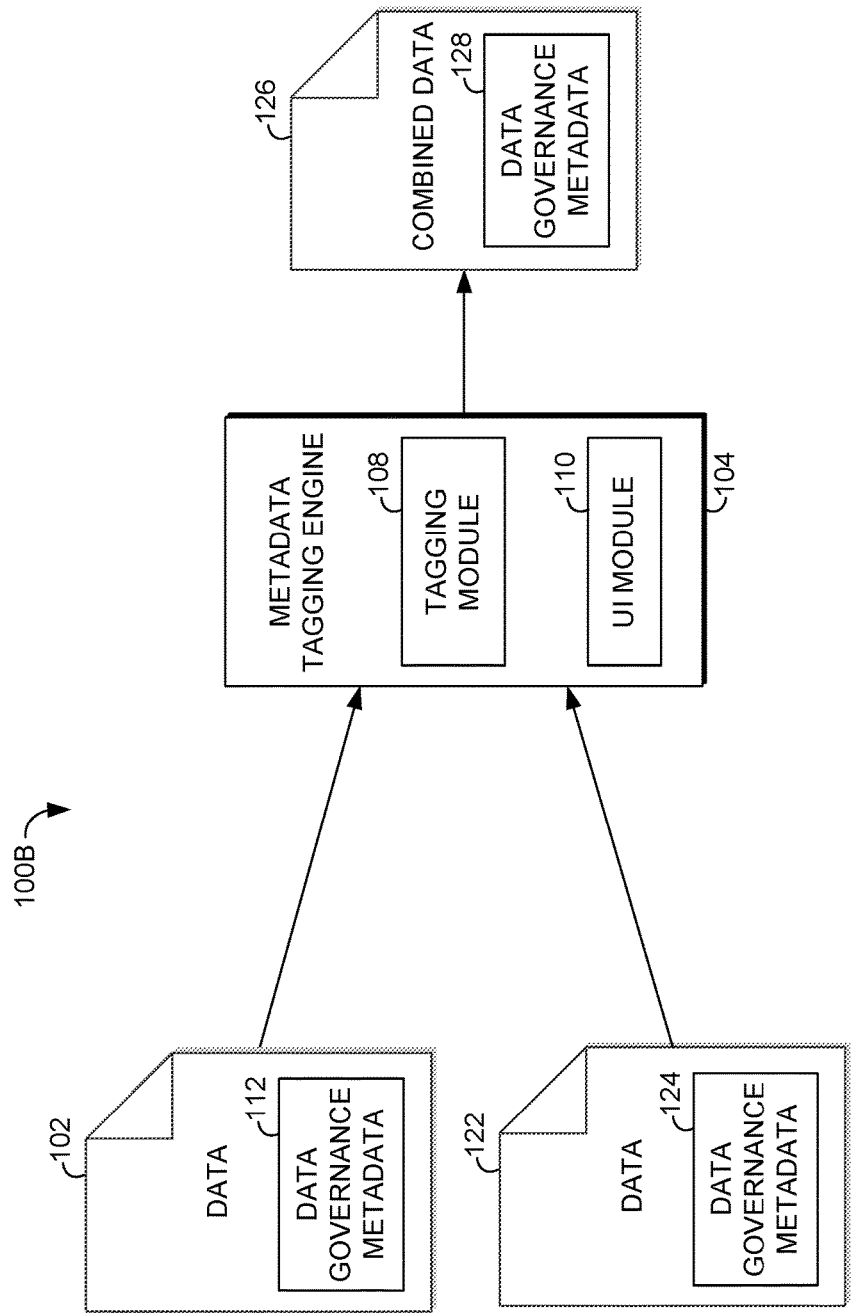

FIG. 1B shows a system 100B in which the metadata tagging engine 104 tags data governance metadata 128 to combined data 126 formed by combining a first piece of data 102 with a second piece of data 122. The data 102 and 122 may be combined to form the combined data 126 using any number of different operations, such as, for instance, joins, intersections of sets, or superimposing fields on one another. Although FIG. 1B shows the metadata tagging engine 104 tagging data governance metadata to combined data formed from two pieces of data, it should be understood that the combined data may be formed from any number of pieces of data.

As shown in FIG. 1B, the data 102 has been previously tagged with data governance metadata 112, and the data 122 has been previously tagged with the data governance metadata 124. Each of the data governance metadata 112 and 124 may include different types of data governance metadata, such as those described above, including: metadata indicating whether the data includes information about a person; metadata indicating an extent to which the data includes information that can be used to identify and/or contact a person; metadata identifying an authentication state at the time of data collection; metadata identifying standard contractual considerations (if any) that apply to the data; and metadata identifying other information that impacts usage of the data.

The tagging module 108 operates to automatically tag the combined data 126 with data governance metadata 128. For most types of data governance metadata, the general rule used by the tagging module 108 is that the data governance metadata is cumulative. This rule applies to data governance metadata identifying authentication state and standard contractual considerations. For instance, if the data governance metadata 112 indicates an identified authentication state and the data governance metadata 124 indicates an ambiguous authentication state, the data governance metadata 128 for the combined data 126 indicates both identified and ambiguous authentication states. As another example, if the data governance metadata 112 indicates a first standard contractual consideration and the data governance metadata 124 indicates second and third standard contractual considerations, the data governance metadata 128 indicates the first, second, and third standard contractual considerations. Similarly, any other information from the data governance metadata 112 and the data governance metadata 124 is provided as other information for the data governance metadata 128.

A cumulative rule cannot be similarly used for data governance metadata regarding an extent to which data can be used to identify and/or contact a person, as combined data can affect this property in unexpected ways. For instance, two or more pieces of data that alone cannot be used to identify and/or contact a person could be combined to form a combined data that can be used to identify and/or contact a person. By way of example to illustrate, suppose three separate pieces of data are combined: a street number, a street name, and a zip code. Alone, these pieces of data cannot be used to identify and/or contact a person, but the combined data provides a full address. Accordingly, in some configurations, the tagging module 108 analyzes the combined data 126, data 102, data 122, metadata for the data 102, and/or metadata for the data 122 to determine an extent to which the combined data can be used to identify and/or contact a person and select an appropriate option for the data governance metadata 128. For example, the tagging module 108 may include rules that when data with certain data fields are combined, particular options for this type of data governance metadata are selected. In some instances, the tagging module 108 may not be able to automatically select an appropriate option for this type of data governance metadata or may simply select a default option. In such instances, the UI module 110 presents a UI that prompts a user to select an option for this type of data governance metadata.

Figure 3:
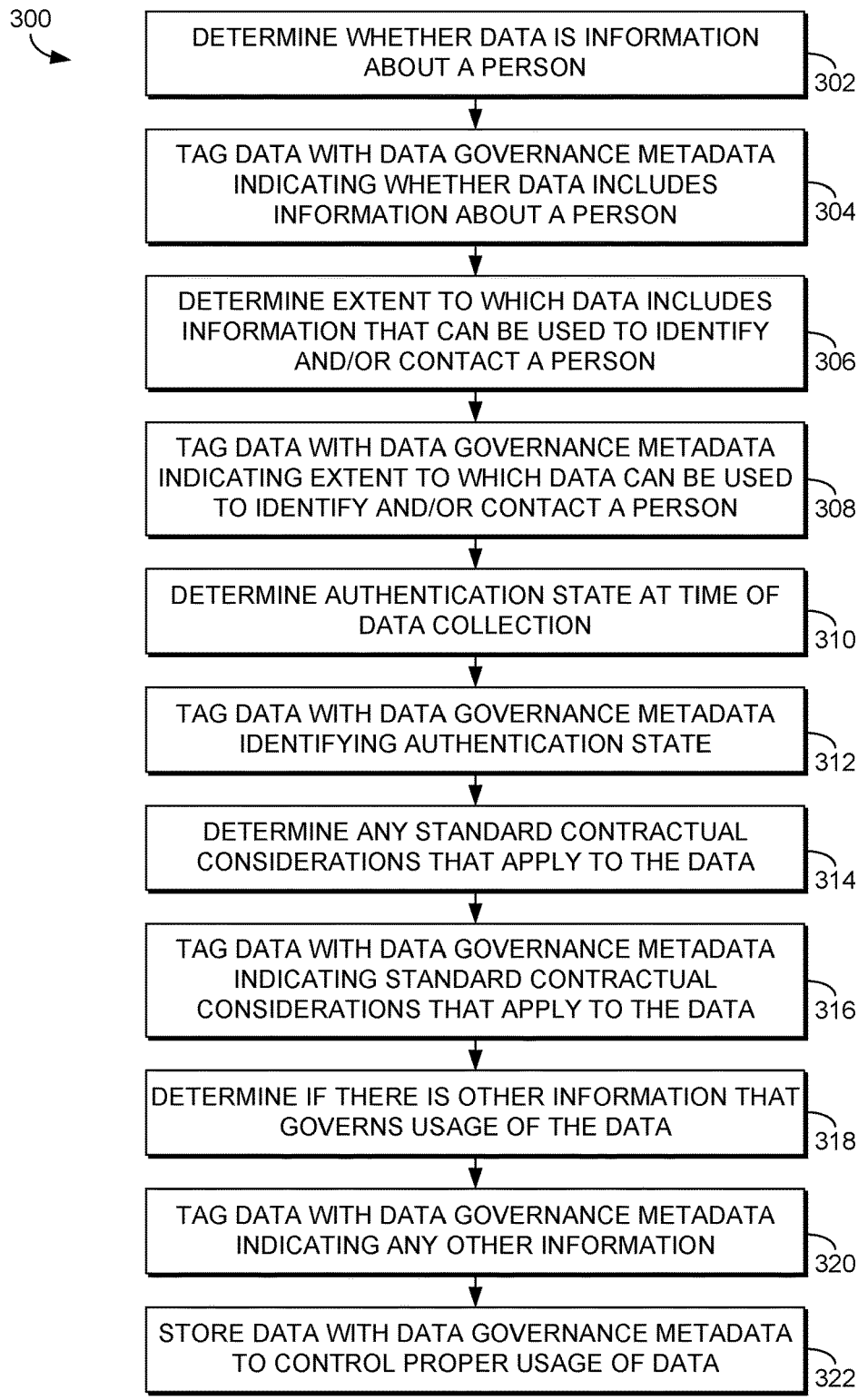
FIG. 3 is a flow diagram showing a method for tagging data with data governance metadata in accordance with implementations of the present disclosure.

Referring next to FIG. 3, a flow diagram is provided illustrating a method 300 for tagging data with data governance metadata. Each block of the method 300 and any other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The method 300 may be performed at least in part, for instance, by the metadata tagging engine 104 of FIG. 1A.

As shown at block 302, a determination is made regarding whether the data is information about a person. Based on this determination, the data is tagged with data governance metadata identifying the data is either information about a person or not information about a person, as shown at block 304. Due to the landscape of regulations and consumer expectations, data about a person should be identified as such. This determination distinguishes between data about a person (indirectly or directly) versus generic data such as catalog data, weather data, etc. Even if the data relates to an anonymous person, the data is nonetheless information about a person, so the determination is "Yes." For example, if the data is information about a specific product (Red, Size 9 Shoes, Model 123), then the data is purely catalog information and is not information about a user such that there are no privacy concerns. However, it the data is able to be related to a given consumer who viewed or liked these shoes, then the data is information about a user. In some embodiments, the default for this determination is "Yes" to ensure privacy is protected. By knowing that data is related to a specific person (pseudonymously or directly), then appropriate policy considerations can be addressed. Additionally, knowing whether the data is about a person or not streamlines access to user data versus non-user data.

At block 306, a determination is made regarding the extent to which the data includes information that can be used to identify and/or contact a person. Based on this determination, the data is tagged with data governance metadata identifying an extent to which the information can be used to identify and/or contact a person, as shown at block 308. The purpose of this data governance metadata is to denote how the data should be treated with respect to security (e.g., best practices call for encryption in transit and at rest of data that directly identifies a person) and data usage (e.g., contractual and regulatory restrictions on use of the data based on the extent to which the user can be identified/contacted using the data).

Figure 4:
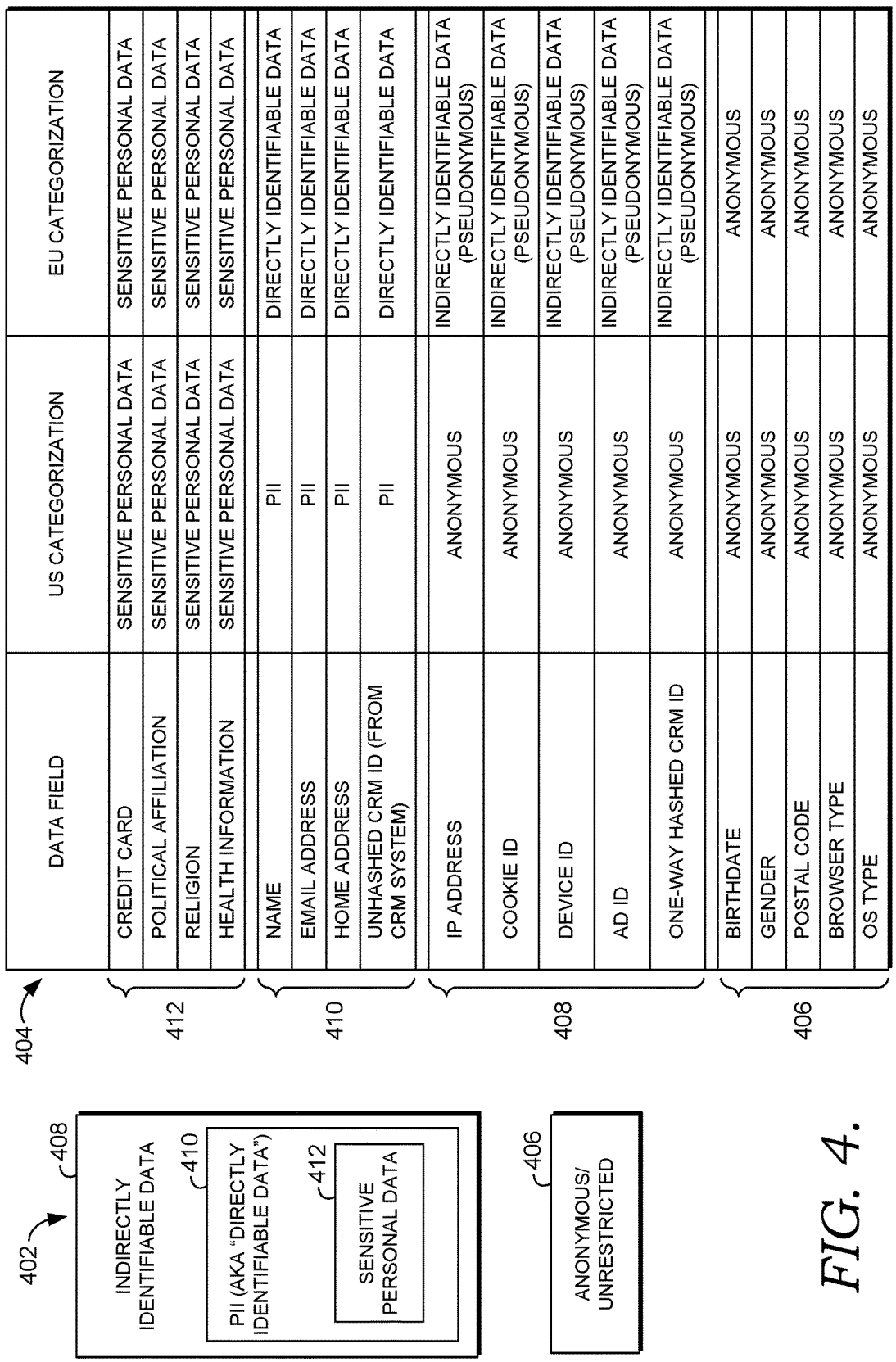
FIG. 4 is diagram and table illustrating options for data governance metadata specifying an extent to which data includes information that can be used to identify and/or contact a person.

In accordance with various embodiments of the present invention, a number of different levels may be employed for this type of data governance metadata. By way of example only and not limitation, one configuration employs four different levels. These four different levels are illustrated by a diagram 402 and table 404 with examples and US/EU categorizations provided in FIG. 4. At one end of the spectrum (i.e., the most unrestricted), data can be identified as anonymous or unrestricted 406. This includes data such as birthdate, gender, postal code, and OS Type, which cannot be used alone to identify the person. At a second level, data can be identified as indirectly identifiable data 408. This includes data such as IP address, cookie ID, device ID, ad ID, or a one-way hashed CRM ID, which does not directly identify a person but can indirectly identify a person, for instance, if the data is connected with another data set. At a third level, data can be identified as personally identifiable information (PII) or directly identifiable data 410. This is data such as name, email address, home address, or an unhashed CRM ID that can be used to directly identify and/or contact a person. A fourth level (i.e., the most restricted) is directed to data that is treated as sensitive personal data 412, such as credit card information, political affiliation, religion, and health information. In some situations, the collection of sensitive personal data may be prohibited, and the fourth level may not be employed. In some configurations, data is tagged with data governance metadata identifying the third level (i.e., directly identifiable) as a default.

Returning to FIG. 3, a determination is made regarding an authentication state at a time of collection of the data, as shown at block 310. The data is tagged with data governance metadata identifying the authentication state, as shown at block 312. Due to consumer expectations, and nascent regulatory leanings, use of data that has been collected while a person is not logged into a site has a complex set of usage parameters. In various embodiments, data may be tagged with various different authentication states. In one particular embodiment, four different authentication states are available. A first authentication state is an identified authentication state in which the person was explicitly logged in/authenticated at the time of data collection. A second authentication state is an incognito authentication state in which the person was explicitly logged out at the time of data collection. A third authentication state is an ambiguous authentication state, which indicates neither logged in nor explicitly logged out. A fourth authentication state is a not provided authentication state, which is used when the authentication state is not known, such as situations in which information identifying the authentication state was not recorded at the time of data collection. In some embodiments, the not provided authentication state is used as a default.

As shown at block 314, a determination is made regarding whether any standard contractual considerations apply to the data. The data is tagged with data governance metadata indicating any standard contractual considerations identified as applying to the data, as shown at block 316. Standard contractual considerations involve various constraints placed on the data, usually by way of contractual restrictions. Contractual restrictions could involve, for instance: third party data providers, ad network providers, social data providers, customer contracts with solution providers, privacy policy agreements with consumers, and consumer opt-out preferences. The data governance metadata for the standard contractual considerations are intended to insure correct use of the data based on contractual restrictions. The data can be tagged with data governance metadata with any combination of standard contractual considerations that apply to the data. For instance, one piece of data may be tagged with multiple standard contractual considerations, while another piece of data may be tagged with no standard contractual considerations.

The standard contractual considerations are "standard" in the sense that a predefined set of options are available for selection to cover a number of typical contractual restrictions. FIG. 5 provides a table 502 identifying a number of standard contractual considerations. These standard contractual considerations include: (1) data cannot be used to build profiles for cross-site targeting; (2) data cannot be used for any targeting, but can be used for analytics/attribution; (3) data cannot be used to build profiles for same-site targeting; (4) data cannot be used to build profiles for analytics; (5) data cannot be used to build any profiles or for any targeting; (6) data cannot be sent to advertising platforms; (7) data cannot be used with directly identifiable information; and (8) data cannot be disclosed to a third party. It should be understood that these standard contractual considerations are provided by way of example only and other standard contractual considerations may be employed within various configurations of the present invention.

Returning again to FIG. 3, a determination is made regarding whether there is any other information that may govern usage of the data, as shown at block 318. The data is tagged with data governance metadata identifying any other information provided, as shown at block 320. Other information is used in situations where non-standard contract clauses or other unique considerations are imposed on the data that are not captured by the standard contractual considerations. In general, there is no fixed rule that applies to this data governance metadata but it is intended to capture information that impacts use of the data that is not dictated by other data governance metadata (e.g., the standard contractual considerations data governance metadata). The data governance metadata tagged to data can be free form text that identifies the other information, such as text that identifies a specific data usage restriction.

The data and data governance metadata are stored in association with one another on a computer storage medium, as shown at block 322. Accordingly, the data is stored with associated data governance metadata such that the data governance metadata can be referenced when the data is intended to be used in order to enforce proper usage of the data.

Although the method 300 shows tagging data with five different types of data governance metadata, some configurations may tag data with only some types of metadata and/or may tag data with additional types of metadata. For instance, some configurations do not use data governance metadata regarding whether the data contains information about the person and/or data governance metadata indicating other information. In some configurations, a determination of whether data includes information about a person is used as a threshold question that dictates the type of data governance metadata to tag to the data. For instance, if the data does not contain information about a person, the data may only be tagged with data governance metadata regarding standard contractual considerations that apply to the data since the other types of data governance metadata may be irrelevant. Alternatively, if the data contains information about a person, the data is tagged with all types of data governance metadata.

As discussed above with reference to FIG. 2, the selection of options for each type of data governance metadata may be done automatically (e.g., via an API) or manually (e.g., via a UI). Accordingly, the determinations performed in the method 300 may be made by any combination of automatic and manual selections of options for the various types of data governance metadata.

Figure 6:
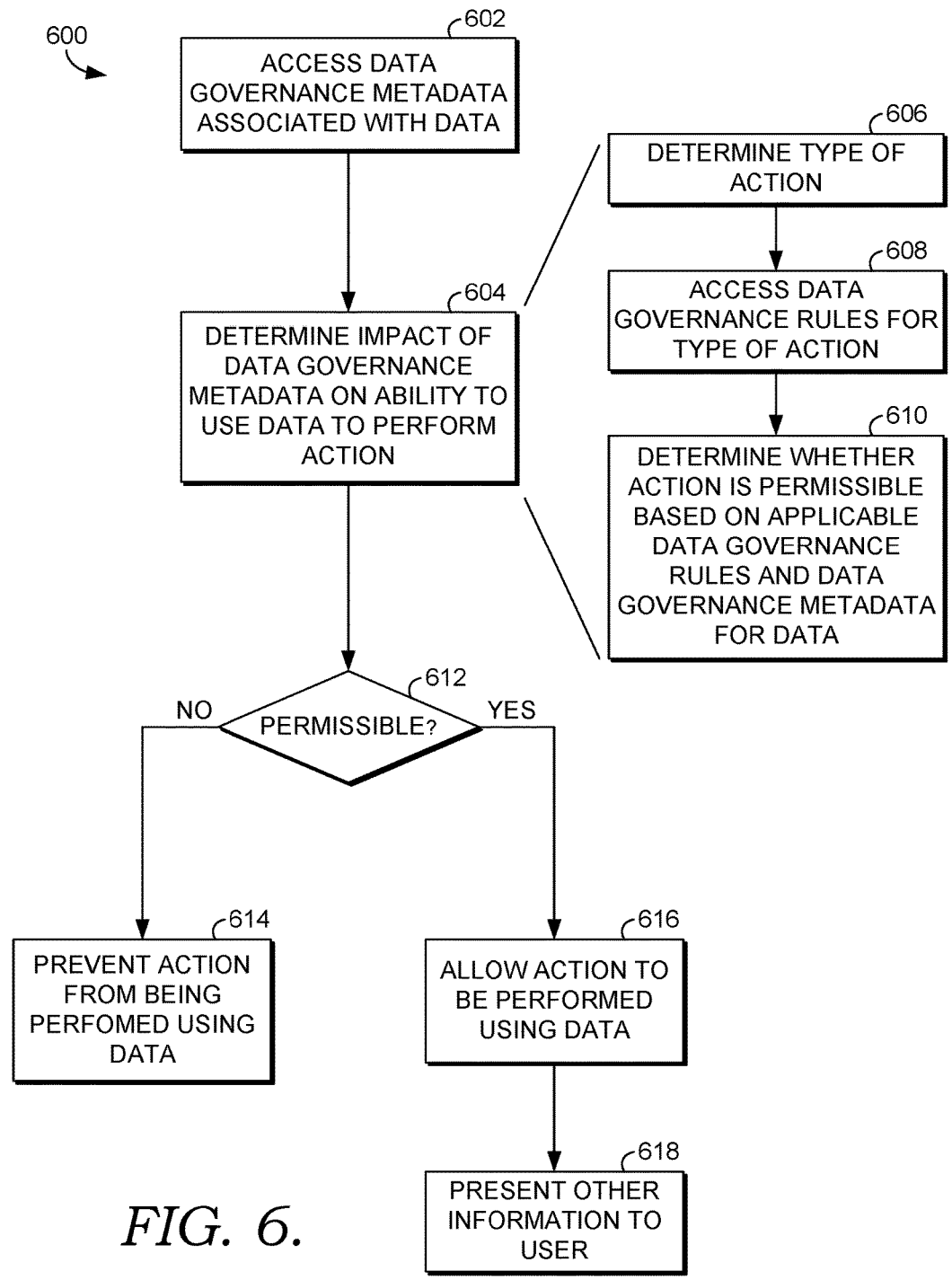
FIG. 6 is a flow diagram showing a method for employing data governance metadata associated with data in determining proper usage of the data within an application in accordance with implementations of the present disclosure.

Turning next to FIG. 6, a flow diagram is provided illustrating a method 600 for employing data governance metadata associated with data in determining proper usage of the data within an application. The method 600 may be performed, for instance, by the data governance module 116 of FIG. 1A. As shown at block 602, the data governance metadata associated with data is accessed.

The impact of the data governance metadata on the ability to perform a particular action using the data is determined at block 604. This may include determining the particular type of action at block 606, accessing a set of data governance rules for that type of action at block 608, and determining whether the action can be performed using the data based on the applicable data governance rules and the data governance metadata for the data at block 610.

Generally, a number of different types of actions may be performed using data within the application. A set of data governance rules is defined for each type of action that sets forth the impact of data governance metadata on usage of the data. By way of example only, FIG. 7 provides a table 702 that lists types of actions 704. For each action, the set of data governance rules indicates: (1) the impact 706 of data governance metadata regarding the extent to which the data includes information that can be used to identify and/or contact a user; (2) the impact 708 of data governance metadata identifying an authentication state at a time of collection of the data; and (3) the impact 710 of data governance metadata identifying any standard contractual considerations that apply to the data. As noted above, each type of data governance metadata may have a set of predefined options. Accordingly, each set of data governance rules sets forth the impact of predefined options for each type of data governance metadata on the ability to perform a corresponding action. As can be understood, the impact defined for each type of data governance metadata may be codependent on other data governance metadata. Additionally, it should be understood that the set of data governance rules and actions set forth in FIG. 7 are provided merely as examples. Each application that uses data can have its own set of data governance rules based on its own use cases and how the data governance metadata applies.

Referring again to FIG. 6, if it is determined that the action using the data is not permissible at block 612, the action is prevented from being performed using the data, as shown at block 614. In some configurations, this could include disabling the action in the application for the data. For instance, a UI element for selecting the action in the application may be grayed out and disabled, or the UI element may be removed from the UI. In some configurations, the action may be prevented by filtering the data from a set of data being retrieved from a data source to perform the action. For instance, the action may be generating and delivering a marketing message to a recipient using various data about the recipient. The action may be permissible for some data and may not permissible for other data based on associated data governance metadata. Accordingly, only the data for which the action is permissible is retrieved and used to generate the marketing message.

Alternatively, if it is determined that the action is permissible using the data at block 612, the action is allowed to be performed using the data, as shown at block 616. As noted previously, some configurations allow for data governance metadata that specify other information regarding the data. Because this other information is open-ended, it may not be possible to configure the application to automatically allow or disallow a particular action based on this type of data governance metadata. Instead, if the data governance metadata includes other information, the other information is presented to a user of the application, as shown at block 618. As such, the user can review the other information and determine whether it impacts the ability to use the data for the particular action.

As noted above, in some configurations, data that is determined to not include information about a person may only be tagged with data governance metadata specifying standard contractual considerations that apply to the data. In such configurations, determining the proper use of such data may involve determining only the impact of the data governance metadata for the standard contractual considerations since that is the only available data governance for the data.

Figure 8:
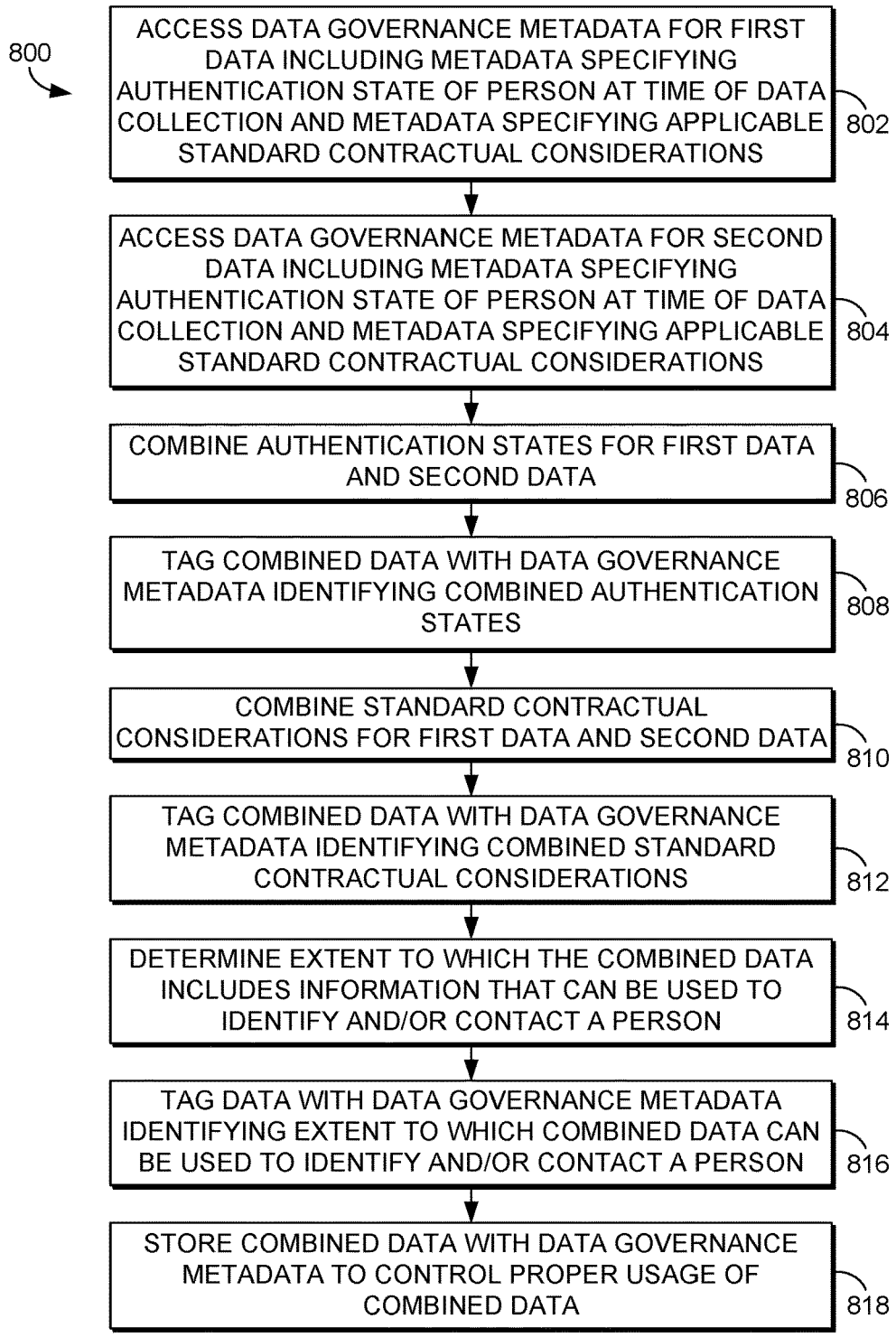
FIG. 8 is a flow diagram showing a method for tagging data governance metadata to combined data generated from the combination of different pieces of data in accordance with implementations of the present disclosure.

With reference now to FIG. 8, a flow diagram is provided illustrating a method 800 for tagging data governance metadata to combined data generated from the combination of different pieces of data. The method 800 may be performed, for instance, by the metadata tagging engine 104 of FIG. 1B. As shown at block 802, data governance metadata for the first data being combined is accessed. The data governance metadata accessed for the first data includes at least the following: (1) data governance metadata specifying an authentication state of a person at a time of collection of the first data; and (2) data governance metadata specifying standard contractual considerations that apply to the first data. In some configurations, the solution also accesses data governance metadata specifying an extent to which the first data comprises information that can be used to identify and/or contact the person.

Similarly, data governance metadata for the second data being combined is accessed, as shown at block 804. The data governance metadata for the second data includes at least the following: (1) data governance metadata specifying an authentication state of the person at a time of collection of the second data; and (2) data governance metadata specifying standard contractual considerations that apply to the second data. In some configurations, the solution also accesses data governance metadata specifying an extent to which the second data comprises information that can be used to identify and/or contact the person.

The data governance metadata specifying the authentication state of the person at a time of collection of the first data is combined with the data governance data specifying the authentication state of the person at a time of collection of second first data, as shown at block 806. The combined data is tagged with the cumulative authentication states, as shown at block 808. For instance, suppose the first data is tagged with an identified authentication state and the second data is tagged with an ambiguous authentication state. Accordingly, the combined data is tagged with data governance metadata that has both the ambiguous and identified states.

As shown at block 810, the data governance metadata specifying standard contractual considerations that apply to the first data are combined with the data governance metadata specifying standard contractual considerations that apply to the second data. The combined data is then tagged with the cumulative standard contractual considerations, as shown at block 812. For instance, suppose that the first data has data governance metadata identifying a first standard contractual consideration that the data cannot be used to build profiles for cross-site targeting. Also, suppose the second data has data governance metadata identifying a third standard contractual consideration that the data cannot be used to build profiles for same-site targeting and a fifth standard contractual consideration that the data cannot be used to build any profiles for targeting. Accordingly, the combined data is tagged with data governance metadata that specifies the first, third, and fifth standard contractual considerations apply to the combined data.

A determination is made regarding an extent to which the combined data includes information that can be used to identify and/or contact a person, as shown at block 814. The combined data is tagged with data governance metadata identifying an extent to which the combined data can be used to identify and/or contact a person, as shown at block 816. In some situations, combinations of data can result in combined data that has a heightened ability to identify/or contact a person. For instance, individual pieces of data may not include information that can be used to identify and/or contact a person, and each piece of data may be tagged with data governance metadata identifying the data as anonymous. However, when those pieces of data are combined, the combined data may no longer be anonymous. As an example to illustrate, suppose three pieces of data are combined: the first piece of data has a street number, the second piece of data has a street name, and the third piece of data has a zip code. Standing alone, each piece of data is anonymous. However, when merged, the combined data is now directly identifiable data (i.e., personally identifiable information). Accordingly, combined data cannot be simply tagged with combined data governance metadata regarding an extent to which each piece of data can be used to identify and/or contact a person. Instead, the combined data is analyzed to determine the proper data governance metadata option. The determination may be done automatically, for instance, by analyzing the combined data, the pieces of data, and/or associated metadata (e.g., data fields) to determine an appropriate option for this type of data governance metadata. For example, when data with certain data fields are combined, a particular option for the data governance metadata can be selected. To illustrate using the previous example, when data with street number, street name, and zip code data fields are combined, the combined data can be automatically tagged as directly identifiable data since combined data formed from data with these data fields provide a full address.

In some instances, combined data may not be automatically tagged with data governance metadata regarding an extent to which the data can be used to identify and/or contact a person. In such instances, the combined data can be manually tagged by a user. For instance, a prompt can be provided for a user to enter information identifying an extent to which the combined data includes information that can be used to identify and/or contact the person. The prompt may present the first and second data being combined or the combined data so the user can review and determine the appropriate data governance metadata. Additionally or alternatively, the prompt may present information regarding data governance metadata for each of the first and second data identifying an extent to which each includes information that can be used to identify and/or contact the person. A user may then select an option regarding an extent to which the combined data includes information that can be used to identify and/or contact the person. For instance, the prompt may include a number of selectable options and the user may enter the information by selecting one of the options.

The combined data and data governance metadata are stored in association with one another on a computer storage medium, as shown at block 818. Accordingly, the combined data is stored with associated data governance metadata such that the data governance metadata can be referenced when the combined data is intended to be used.

Although the method 800 of FIG. 8 discusses combining only two pieces of data, a similar approach can be used when combining any number of pieces of data. In particular, the data governance metadata for authentication state and standard contractual considerations are cumulative for the various pieces of data to tag the combined data with those types of data governance metadata. Additionally, data governance metadata indicating an extent to which the combined data can be used to identify and/or contact a person can be determined by algorithmically analyzing the combined data, various data pieces, and/or associate metadata or manually selected by prompting a user to select an option for this type of data governance metadata.

Figure 9:
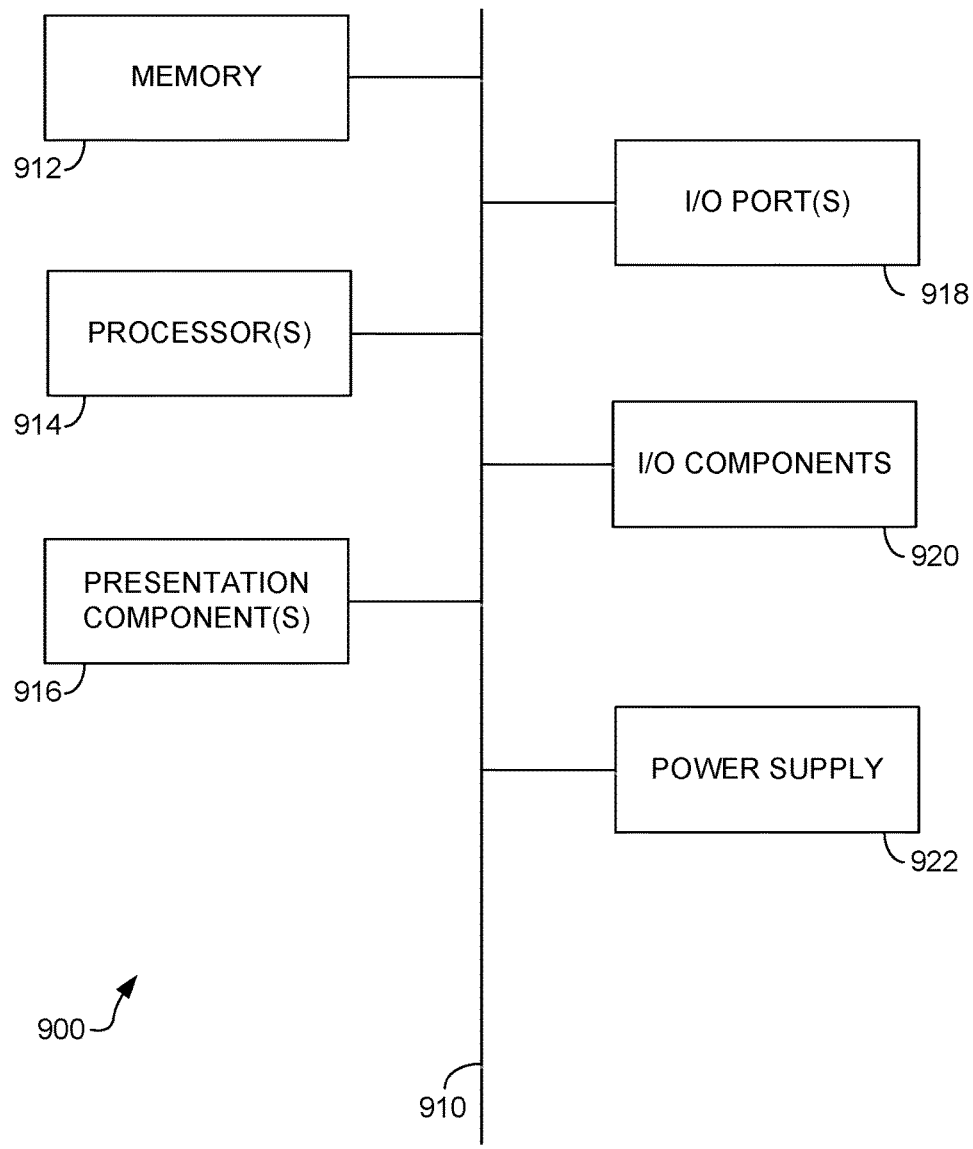
FIG. 9 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion.

As described above, implementations of the present disclosure relate to tagging data with standard types of data governance metadata having predefined options for each type. Additionally, implementations relate to consulting the data governance metadata using data governance rules when determining whether the data can be used to perform particular actions. Further implementations address tagging data governance metadata to combined data formed from multiple pieces of data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for controlling use of data about a person based on data governance metadata that governs the use of the data by an application, the method comprising:
    accessing the data governance metadata for the data about the person, the data governance metadata including a first data governance metadata identifying an extent to which the data about the person includes information that can be used to identify and/or contact the person, a second data governance metadata identifying an authentication state indicating an extent to which the person was authenticated at a time when the data about the person was collected, and a third data governance metadata identifying any standard contractual considerations that apply to the data about the person, the first, second, and third data governance metadata each corresponding with at least one option from a plurality of predefined options of data governance metadata;
    determining an impact of the first, second, and third data governance metadata on an ability of the application to perform an action using the data about the person based on a set of data governance rules for the action, the set of data governance rules being separate from the first, second, and third data governance metadata and defining an impact of different types of data governance metadata on the ability to perform the action;
    if it is determined the impact indicates the action is not permissible using the data about the person, preventing the action from being performed by the application using the data about the person; and
    if it is determined the impact indicates the action is permissible using the data about the person, allowing the action to be performed by the application using the data about the person.

2. The method of claim 1, wherein determining the impact of the first, second, and third data governance metadata on the ability to perform the action using the data comprises:
    determining the action comprises a first type of action;
    accessing the set of data governance rules corresponding to the first type of action; and
    determining whether the action can be performed using the data based on the set of data governance rules corresponding to the first type of action and the first, second, and third data governance metadata for the data.

3. The method of claim 2, wherein the set of data governance rules sets forth a first impact of a first type of data governance metadata on the first type of action, a second impact of a second type of data governance metadata on the first type of action, and a third impact of a third type of data governance metadata on the first type of action, wherein the first, second, and third data governance metadata for the data respectively correspond to the first, second, and third type of data governance metadata.

4. The method of claim 3, wherein the first impact of the first type of data governance metadata on the first type of action is defined based on a set of predefined options for the first type of data governance metadata, the second impact of the second type of data governance metadata on the first type of action is defined based on a set of predefined options for the second type of data governance metadata, and the third impact of the third type of data governance metadata on the first type of action is defined based on a set of predefined options for the third type of data governance metadata.

5. The method of claim 4, wherein the set of predefined options for the first type of data governance metadata comprises information identifying at least one selected from the following: unrestricted data; indirectly identifiable data; directly identifiable data; and sensitive personal data.

6. The method of claim 4, wherein the set of predefined options for the second type of data governance metadata comprises information identifying at least one selected from the following: an identified authentication state; an incognito authentication state; an ambiguous authentication state; and authentication state not provided.

7. The method of claim 4, wherein the set of predefined options for the third type of data governance metadata comprises information that indicates at least one selected from the following: the data cannot be used to build profiles for cross-site targeting; the data cannot be used for any targeting, but can be used for analytics/attribution; the data cannot be used to build profiles for same-site targeting; the data cannot be used to build profiles for analytics; the data cannot be used to build any profiles or for any targeting; the data cannot be sent to advertising platforms; the data cannot be used with directly identifiable information; and the data cannot be disclosed to a third party.

8. The method of claim 1, wherein if it is determined the action is not permissible using the data, preventing the action from being performed using the data comprises disabling the action for the data within the application, wherein disabling the action for the data within the application comprises at least one selected from the following: displaying a user interface element for the action within the application as grayed out, and removing the user interface element for the action from a user interface of the application.

9. The method of claim 1, wherein if it is determined the action is not permissible using the data, preventing the action from being performed using the data comprises filtering the data from a set of data being retrieved from a data source to perform the action on the set of data.

10. The method of claim 1, wherein the method further includes:
accessing fourth data governance metadata identifying other information governing use of the data; and
presenting the other information to a user of the application.

11. One or more non-transitory computer storage media storing computer-useable instructions that, when executed by a computing device, cause the computing device to perform operations for controlling use of data about a person based data governance metadata that governs the use of the data by an application, the operations comprising:
accessing the data governance metadata for the data about the person, the data governance metadata including: a first data governance metadata corresponding to a first type of data governance metadata identifying an extent to which the data about the person includes information that can be used to identify and/or contact a person, a second data governance metadata corresponding to a second type of data governance metadata identifying an authentication state indicating an extent to which the person was authenticated at a time when the data about the person was collected, and a third data governance metadata corresponding to the third type of data governance metadata identifying any standard contractual considerations that apply to the data, the first, second, and third data governance metadata each corresponding with at least one option from a plurality of predefined options of data governance metadata;
determining an impact of the first, second, and third data governance metadata for the data about the person on an ability to perform an action within the application using the data by:
determining the action comprises a first type of action,
accessing a set of data governance rules for the first type of action, the set of data governance rules being separate from the first, second, and third data governance metadata, the set of data governance rules including a first impact of the first type of data governance metadata on the first type of action, a second impact of the second type of data governance metadata on the first type of action, and a third impact of the third type of data governance metadata on the first type of action, and
comparing the first, second, and third data governance metadata for the data about the person with the first, second, and third impacts set forth by the set of data governance rules to determine whether the data governance metadata prevents the action from being performed by the application using the data about the person;
if it is determined the action is not permissible using the data about the person, preventing the action from being performed by the application using the data about the person; and
if it is determined the action is permissible using the data about the person, allowing the action to be performed by the application using the data about the person.

12. The one or more computer storage media of claim 11, wherein the first impact of the first type of data governance metadata on the first type of action is defined based on a set of predefined options for the first type of data governance metadata, the second impact of the second type of data governance metadata on the first type of action is defined based on a set of predefined options for the second type of data governance metadata, and the third impact of the third type of data governance metadata on the first type of action is defined based on a set of predefined options for the third type of data governance metadata.

13. The one or more computer storage media of claim 12, wherein the set of predefined options for the first type of data governance metadata comprises information identifying at least one selected from the following: unrestricted data; indirectly identifiable data; directly identifiable data; and sensitive personal data.

14. The one or more computer storage media of claim 12, wherein the set of predefined options for the second type of data governance metadata comprises information identifying at least one selected from the following: an identified authentication state; an incognito authentication state; an ambiguous authentication state; and authentication state not provided.

15. The one or more computer storage media of claim 12, wherein the set of predefined options for the third type of data governance metadata comprises information that indicates at least one selected from the following: the data cannot be used to build profiles for cross-site targeting; the data cannot be used for any targeting, but can be used for analytics/attribution; the data cannot be used to build profiles for same-site targeting; the data cannot be used to build profiles for analytics; the data cannot be used to build any profiles or for any targeting; the data cannot be sent to advertising platforms; the data cannot be used with directly identifiable information; and the data cannot be disclosed to a third party.

16. The one or more computer storage media of claim 11, wherein the operations further comprise:
   accessing fourth data governance metadata identifying other information governing use of the data; and
   presenting the other information to a user of the application.

17. A computer system for controlling use of data about a person based on data governance metadata that governs the use of the data by an application, the system comprising:
   one or more hardware processors; and
   one or more computer storage media storing computer useable instructions to cause the one or more processors to:
   access the data governance metadata for the data about the person, the data governance metadata including: a first data governance metadata corresponding to a first type of data governance metadata identifying an extent to which the data about the person includes information that can be used to identify and/or contact the person, a second data governance metadata corresponding to a second type of data governance metadata identifying an authentication state indicating an extent to which the person was authenticated at a time when the data about the person was collected, and a third data governance metadata corresponding to a third type of data governance metadata identifying any standard contractual considerations that apply to the data about the person, the first, second, and third data governance metadata each corresponding with at least one option from a plurality of predefined options of data governance metadata;
   determine an impact of the first, second, and third data governance metadata for the data about the person on an ability to perform an action within the application using the data about the person by:
   accessing a set of data governance rules for the action, the set of data governance rules being separate from the first, second, and third data governance metadata, the set of data governance rules including a first impact of the first type of data governance metadata on the first type of action, a second impact of the second type of data governance metadata on the first type of action, and a third impact of the third type of data governance metadata on the first type of action, and
   comparing the first, second, and third data governance metadata for the data about the person with the first, second, and third impacts set forth by the set of data governance rules to determine whether the data governance metadata prevents the action from being performed by the application using the data about the person;
   if it is determined the action is not permissible using the data about the person, preventing the action from being performed by the application using the data about the person; and
   if it is determined the action is permissible using the data about the person, allowing the action to be performed by the application using the data about the person.

18. The system of claim 17, wherein accessing the set of data governance rules for the action comprises:
   identifying the action as a first type of action; and
   accessing the set of data governance rules corresponding to the first type of action.

19. The system of claim 17, wherein the first impact of the first type of data governance metadata on the first type of action is defined based on a set of predefined options for the first type of data governance metadata, the second impact of the second type of data governance metadata on the first type of action is defined based on a set of predefined options for the second type of data governance metadata, and the third impact of the third type of data governance metadata on the first type of action is defined based on a set of predefined options for the third type of data governance metadata;
   wherein the set of predefined options for the first type of data governance metadata comprises information identifying at least one selected from the following: unrestricted data; indirectly identifiable data; directly identifiable data; and sensitive personal data;
   wherein the set of predefined options for the second type of data governance metadata comprises information identifying at least one selected from the following: an identified authentication state; an incognito authentication state; an ambiguous authentication state; and authentication state not provided; and
   wherein the set of predefined options for the third type of data governance metadata comprises information that indicates at least one selected from the following: the data cannot be used to build profiles for cross-site targeting; the data cannot be used for any targeting, but can be used for analytics/attribution; the data cannot be used to build profiles for same-site targeting; the data cannot be used to build profiles for analytics; the data cannot be used to build any profiles or for any targeting; the data cannot be sent to advertising platforms; the data cannot be used with directly identifiable information; and the data cannot be disclosed to a third party.

20. The system of claim 17, wherein the instructions further cause the one or more processors to:
   access fourth data governance metadata identifying other information governing use of the data; and
   present the other information to a user of the application.

* * * * *